June 27, 1967 M. NUSSBAUMER 3,327,964
CLINGING ROLL FOR WIRE UNREELER BRAKING SYSTEM
Filed June 20, 1966
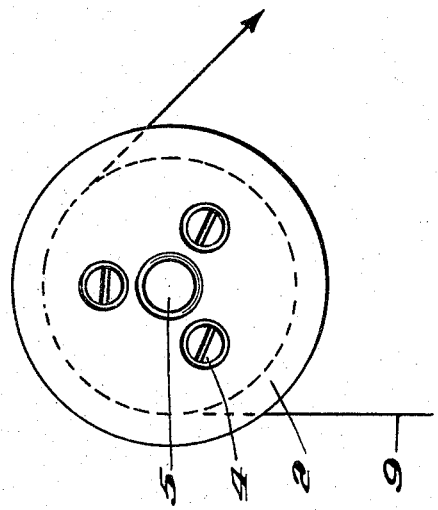
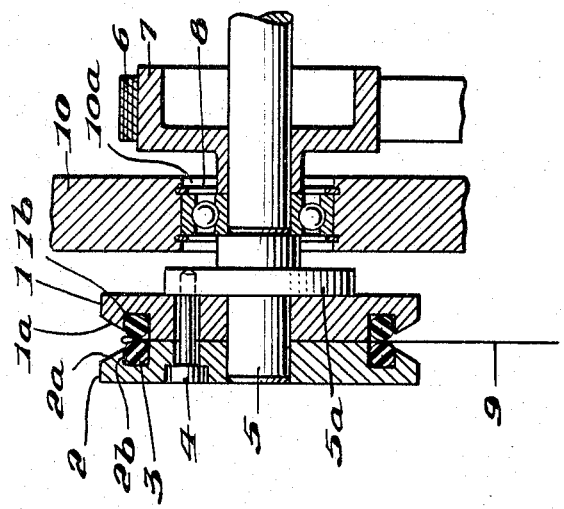
INVENTOR.
Manfred Nussbaumer
BY
Pierce, Scheffler & Parker
ATTORNEYS

United States Patent Office 3,327,964
Patented June 27, 1967

3,327,964
CLINGING ROLL FOR WIRE UNREELER
BRAKING SYSTEM
Manfred Nussbaumer, Dietikon, Switzerland, assignor to Micafil A.-G., Zurich, Switzerland, a joint-stock company
Filed June 20, 1966, Ser. No. 558,760
Claims priority, application Switzerland, July 13, 1965, 6,423/65
1 Claim. (Cl. 242—155)

ABSTRACT OF THE DISCLOSURE

A wire guide roll structure for a wire unreeler braking system comprises two roll halves which are secured together. A generally V-shaped entrance groove for the wire is provided at the periphery of the roll, and located radially inward from this groove are a pair of elastic rings seated in corresponding circular recesses in each roll half. The two O-rings are pressed together to form the bottom of the groove and establish a nip in which the wire is received in a manner providing a friction drive for the roll as the wire is run onto and off a portion of the circumference of the roll.

---

The present invention relates to an improvement in a "clinging" roll for wire unreeler braking systems.

In order to compensate for irregularities in the tension of a wire being led from a supply reel to a spool on which the wire is being wound on a winding machine to form electrical coils, so that the wire tension can be maintained at substantially a constant value, provision must be made for applying a variable degree of braking to the wire intermediate the supply reel and winding spool. For this purpose, the wire can be led, for example, over a guide roll mounted at one end of a pivotally mounted "swing" arm, and movement of the swing arm about its pivotal support as a result of a change in wire tension causes a band brake to be actuated via a lever transmission to increase or decrease the braking effect inversely with the sense of the change in wire tension.

The guide roll can also be fastened to the unreeling device itself, thus acting directly upon the band brake without the interposition of a "swing" arm. In this latter case, however, care must be taken to ensure that the guide roll is driven by the wire as it unreels. This driving action of the wire on the guide roll is conveniently obtained by providing the roll with a sharp, acute-angled groove in which the wire rides. With an increase in wire tension above the normal value desired to be maintained, the wire squeezes itself more into this groove and thus establishes a friction drive for the guide roll. However, in the course of time, chamfers are formed in this groove which are apt to damage the insulation on the wire. Another expedient which has been used for driving the guide roll by the wire is to establish a groove in the roll which is at a broader angle which for itself does not exert any braking action upon the wire. In this case, the desired variable braking action is obtained by winding it around the roll groove for several turns, but damage to the wire insulation is still apt to occur because of the scrubbing action of the wire turns in the groove against one another as the wire runs on and off the groove.

The object of the present invention is to provide an improved construction for a guide roll which will serve to establish the desired driving action as between the wire and roll and yet prevent any possibility of damage to the wire which runs over the guide roll.

In accordance with the invention, the improved guide roll is comprised of two halves which are joined together, each half including a circular recess, and an elastic ring being seated in the recess, the elastic rings forming therebetween an elastic groove in which the wire rides in a harmless manner so as to establish the desired friction drive between the wire and roll.

The foregoing as well as other objects and advantages inherent in the invention will become more apparent from the following description of one suitable embodiment thereof and from the accompanying drawings which illustrate it. In these drawings:

FIG. 1 is a view in central section in the direction of the axis of rotation of the roll; and FIG. 2 is a side elevation looking from the left as viewed in FIG. 1.

With reference now to the drawings, the improved guide roll is seen to be comprised of two circular halves 1 and 2 which are secured to each other and to a flange 5a on shaft 5 on which the roll is mounted for rotation by means of a plurality of screw bolts 4. Shaft 5 passes through an opening 10a in housing wall 10 and is journalled in that opening by means of a ball bearing 8. On the side of housing wall 10 opposite the guide roll 1, 2, is the brake drum 7 which is secured upon shaft 5 and a brake lining 6 is provided for braking action on the periphery of the brake drum. This lining represents the connection to the actual braking system, which is conventional and hence has not been detailed.

As seen in FIG. 1, the confronting end faces of the two roll halves 1, 2 are each provided with a bevel 1a, 2a, which establish a generally V-shaped groove to receive the wire 9. The end face of each roll half also includes a circular recess 1b, 2b located radially inward from the bevelled portions 1a, 2a and opening in the axial direction, and a ring of elastic material 3 is tightly seated in each recess. Rings 3 are of circular cross-section i.e. O-rings and preferably made of rubber. The rings are so dimensioned in relation to their seating recesses so as to project slightly beyond the end face of the roll half prior to assembly of the two roll halves together. Thus when the bolts 4 are screwed in to secure the roll halves together so that their end faces abut, the contacting surfaces of the two rubber rings will be some flattened from their initial arcuate curvtaure and between them establish the bottom of the groove in which the wire rides. As the wire tension changes, the wire will be drawn more or less into pressure contact with the rings 3 and thus establish the desired drive for the guide roll 1, 2. Because of the fact that the rings 3 are made from an elastic material, preferably rubber, there is no danger of damage to the wire insulation as the wire runs on and off the guide roll, and tests have shown that a positive friction drive as between the wire and guide roll is established when the wire is in contact with only 35% of the periphery of the elastic rings.

I claim:

In a wire guide roll structure for a wire unreeler braking system wherein said roll is secured upon a rotatable shaft upon which a braking device is mounted and wherein the wire passes around and is in contact with at least a part of the periphery of the roll, the improvement wherein said roll is comprised of two circular roll halves, said roll halves including bevelled peripheral portions establishing a generally V-shaped entrance groove for the wire, said roll halves further including confronting circular recesses in confronting end faces thereof located radially inward from said tapered peripheral portions and an O-ring of elastic material seated in each recess, said elastic rings being so dimensioned in relation to their seating recesses as to project slightly beyond the end face of the roll half prior to assembly thereof, and means securing said roll halves together so that their end faces abut thereby to effect a mutual compression of said rings and establish a nip at the bottom of said groove in which the wire is received.

References Cited

UNITED STATES PATENTS

| | | | |
|---|---|---|---|
| 334,998 | 1/1886 | Wardwell | 74—230.7 |
| 413,657 | 10/1889 | Gibbs | 242—155 |
| 2,909,341 | 10/1959 | Kingsley | 242—151 |

STANLEY N. GILREATH, *Primary Examiner.*